United States Patent [19]

Schilling

[11] Patent Number: 5,012,870
[45] Date of Patent: May 7, 1991

[54] AMINATED SULFONATED OR SULFORMETHYLATED LIGNINS AS CEMENT FLUID LOSS CONTROL ADDITIVES

[75] Inventor: Peter Schilling, Charleston, S.C.

[73] Assignee: Westvaco Corporation, New York, N.Y.

[21] Appl. No.: 512,269

[22] Filed: Apr. 20, 1990

Related U.S. Application Data

[62] Division of Ser. No. 312,497, Feb. 21, 1989, Pat. No. 4,990,191.

[51] Int. Cl.$^5$ .............................................. E21B 33/14
[52] U.S. Cl. .................................... 166/293; 106/729; 530/501
[58] Field of Search ................ 166/291, 293; 106/719, 106/729, 123.1; 530/501, 503; 527/403

[56] References Cited

U.S. PATENT DOCUMENTS

| | | | |
|---|---|---|---|
| 3,234,154 | 2/1966 | Martin | 106/823 X |
| 3,821,985 | 7/1974 | George | 166/293 |
| 3,912,706 | 10/1975 | Rachor et al. | 527/403 |
| 3,956,140 | 5/1976 | Nahm et al. | 166/293 X |
| 3,959,004 | 5/1976 | Stryker | 166/293 X |
| 4,047,567 | 9/1977 | Childs et al. | 166/293 |
| 4,125,160 | 10/1978 | Crinkelmeyer et al. | 166/293 |
| 4,450,009 | 5/1984 | Childs et al. | 166/293 X |
| 4,455,257 | 6/1984 | Hoftiezer et al. | 503/501 |
| 4,461,644 | 7/1984 | Childs et al. | 166/293 X |
| 4,674,574 | 6/1987 | Savoly et al. | 166/293 |
| 4,732,572 | 3/1988 | Dilling | 106/123.1 X |
| 4,775,744 | 10/1988 | Schilling et al. | 530/501 |
| 4,797,157 | 1/1989 | Dilling et al. | 106/123.1 X |
| 4,818,288 | 4/1989 | Ansberger et al. | 166/293 X |

Primary Examiner—George A. Suchfield
Attorney, Agent, or Firm—Terry B. McDaniel; Daniel B. Reece, IV; Richard L. Schmalz

[57] ABSTRACT

A hydraulic cement slurry is disclosed which has low fluid loss properties. In addition to water and hydraulic cement, the hydraulic cement slurry contains a fluid loss control additive comprising a sulfonated or sulfomethylated kraft lignin that has been aminated by reacting it with a polyamine and an aldehyde. The slurry also contains sodium carbonate, sodium phosphate, sodium sulfite, sodium metasilicate or naphthalene sulfonate.

6 Claims, No Drawings

AMINATED SULFONATED OR SULFORMETHYLATED LIGNINS AS CEMENT FLUID LOSS CONTROL ADDITIVES

This is a division of application Ser. No. 07/312,497, filed Feb. 21, 1989 now U.S. Pat. No. 4,990,191.

BACKGROUND OF THE INVENTION

1. Field of the Invention

This invention relates generally to oil well cementing compositions and particularly to lignin-based additives to cementing compositions for reducing fluid loss from the cementing composition to the surrounding subterranean formation which the well has penetrated.

2. Description of the Related Art

Cement compositions are used in the oil and gas industry to cement the annular space in the well bore between the casing and the surrounding formation. Cementing is done not only to secure the casing firmly in place but also to cement off permeable zones of permeable formations into which valuable materials may be lost and to prevent the intrusion of extraneous matter into the petroleum fluid producing zone.

Typically, a cement slurry is pumped downwardly through the tubing within the well casing and flows out of the open lower end of the casing at the well bottom. It is then forced upwardly around the casing in the annular space between the outer wall of the casing and the wall of the wellbore. Commonly, additives of various sorts are added to the cement slurry to control thickening times, weight, strength, and other characteristics of the cements to accommodate the wide variety of temperatures and pressures of various types of oil and gas wells.

When hydraulic cement is placed within or next to a porous medium such as the earthen strata of a well bore, there is often a tendency, especially in deep wells where high temperatures and pressures are common, for water to filter out of the cement slurry and into the surrounding strata. This fluid loss is undesirable because it may lead to contamination of the formation by the cement filtrate, premature setting of the cement, and reduced compressive strength of the set cement. To combat and control fluid loss in the well cementing process, various additives known as fluid loss agents have been discovered and employed in the industry. Examples of commonly used fluid loss control additives include cellulose derivatives such a carboxymethyl hydroxyethyl cellulose (CMHEC), and hydroxyethyl cellulose (HEC), and polyethylene amines, naphthalene sulfonates, polymer latex, polyacrylamides, and combinations of these. The particular fluid loss control additive used depends upon many factors such as the particular cement used, the temperature and pressure to be encountered in the well, and the depth of the well. The expense of the additive is a factor, especially in deep wells where a large quantity of cement must be used.

It would be desirable to have a fluid loss control additive derived from a readily available and relatively inexpensive material such as lignin, which is produced in large quantities as a byproduct of the pulp and paper industry. Lignin-derived compositions are already used in cement slurries as set retardation agents, as disclosed in U.S. Pat. Nos. 3,375,873; 3,662,830; 3,821,985; 4,047,567; 4,065,318; 4,296,813; RE 31,190; and RE 31,127. U.S. Pat. No. 4,125,160 and U.S. Pat. No. 4,131,578 teach a method and composition for a fluid loss additive composed of a blend of a polyamine, a lignoamine and/or lignosulfonate, a borate ion releasing compound and a carbonate and/or bicarbonate.

SUMMARY OF THE INVENTION

It has been found that sulfonated or sulfomethylated lignin, after being reacted with a polyamine and formaldehyde shows good fluid loss control for cement slurries when applied in combination with sodium carbonate, a formaldehyde-naphthalene sulfonate condensate (Lomar ® D), or an inorganic salt such as sodium sulfite, sodium metasilicate or sodium phosphate.

The sulfonated or sulfomethylated aminated lignin shows less retardation (shorter thickening time) than a sulfonated or sulfomethylated lignin without the attached amine.

DETAILED DESCRIPTION OF THE PREFERRED EMBODIMENT

The hydraulic cement slurry of the present invention comprises a hydraulic cement with an effective amount of water depending upon the type of cement used for a specific application. The amount of water may be anywhere from 25 to 105 parts per 100 parts of cement. The term "hydraulic cement" is meant to encompass any inorganic cement such as those falling within the American Petroleum Institute (API) classes designated A, B, C, D, E, F, G, H, J, and N.

The cement slurry of the present invention also includes an effective amount of a sulfonated or sulfomethylated lignin that has been reacted with about 2-5 moles of a polyamine and an aldehyde by the Mannich reaction, whereby nitrogen functionality is introduced into lignin at the unsubstituted position ortho to the phenolic hydroxyl group:

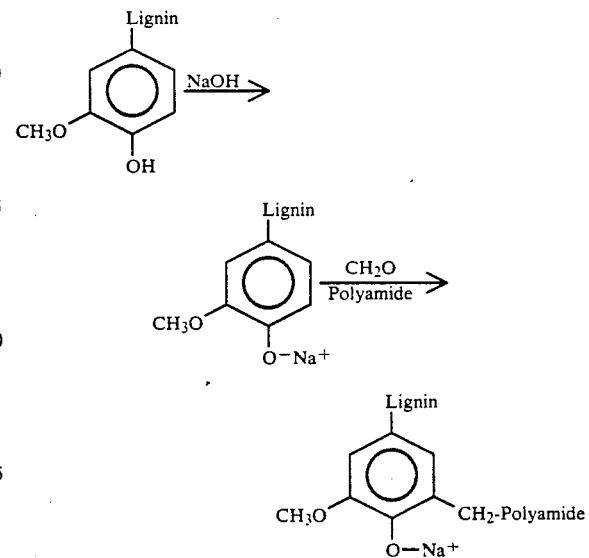

Generally the Mannich reaction is carried out by suspending sulfonated or sulfomethylated kraft lignin in water, adding the desired amine and aldehyde, and heating for 2-20 hours at 50°–100° C.

The amount of sulfonated or sulfomethylated aminated lignin may be anywhere from about 0.5 to 2.5 parts per 100 parts cement.

Sulfonated or sulfomethylated lignins as used in this invention may be prepared from the lignin obtained as byproducts from the kraft process of the pulping of woody materials. The waste liquors from such pulping contain large quantities of lignin and lignin decomposition products, which can be sulfonated or sulfomethylated by known processes, such as high temperature sulfonation, oxidative sulfonation at ambient temperature, or sulfomethylation by reaction of lignin, sodium sulfite and formaldehyde. Sulfonated lignins may also be obtained from the sulfite pulping process.

Polyamines suitable to undergo the Mannich reaction with formaldehyde or other aldehydes as well as polyaldehydes are imidazoline forming polyethylene amines and polyamines characterized by at least one ethylene diamine functional group with at least three hydrogens attached to the two nitrogens. Compounds of this group which are able to give both amidoamines and imidazolines are: ethylene diamine, diethylene triamine, triethylene tetramine, tetraethylene pentamine, pentaethylene hexamine, and higher homologues; N-aminoethylpropane-diamine, N,N-diaminoethyl propane diamine and the N-aminoethyl or N,N-diaminoethyl substituted butane diamines, pentane diamines and hexane diamines, as well as N-hydroxy ethyl ethylene diamine. These compounds have the general formulae:

H$_2$NCH$_2$CH$_2$NHR

R = H-, CH$_3$-, C$_2$H$_5$-, C$_3$H$_7$-,

-CH$_2$CH$_2$OH, -(CH$_2$CH$_2$NH)$_x$H x = 1, 2, 3, 4, ... 10 or

R'R''N(CH$_2$)$_y$NHR'''

R' = H-, CH$_3$-, C$_2$H$_5$-, C$_3$H$_7$-, NH$_2$CH$_2$CH$_2$-,

R'' = H-, CH$_3$-, C$_2$H$_5$-,

R''' = H-, CH$_3$-, C$_2$H$_5$-, C$_3$H$_7$-, NH$_2$CH$_2$CH$_2$-, y = 2, 3, 4, 5, 6.

Amines capable of forming amidoamines but not imidazolines are: 1,3-diaminopropane; 1,4-diaminobutane; 1,5-diaminopentane; 1,6-diaminohexane; piperazine (1,4-diazacyclohexane); N-aminoethyl piperazine; N-hydroxyethyl piperazine; N-aminopropyl-propane diamine; 1,3-N-methyl N-aminopropylpropane diamine; 1,3-N-N-dimethylpropane diamine; 1,3-N-N-diethylpropane diamine; 1,3-N-N-dimethylethylene diamine; N-aminohexyl hexane diamine-1,6.

Diamines whereby the amino groups are separated by polyethylene oxide chains or polypropylene oxide chains are also very suited for the Mannich reaction. These compounds have the general formulae:

H$_2$NCH$_2$CH$_2$O(CH$_2$CH$_2$O)$_x$CH$_2$CH$_2$NH$_2$ x = 0-100

H$_2$NCH$_2$CH$_2$O(CH$_2$CH$_2$O)$_y$CH$_2$CH$_2$NH$_2$
      |                |              |
      CH$_3$           CH$_3$         CH$_3$ y = 0-100

The above described amines can be further modified by reaction with alkylating agents or cross-linking agents such as are described in U.S. Pat. No. 4,775,744 by P. Schilling et al. in connection with lignin modification. Modified amines or amine mixtures with increased molecular weight or amines which have additional reactive functionalities such as sulfonic acid, carboxyl, hydroxyl, nitrile, and quaternary-ammonium groups will be obtained. For the aminomethylation, however, it is necessary that at least one hydrogen on any of the nitrogens of the parent polyamine be available for the condensation with formaldehyde.

The polyamine as used in the practice of this invention may be a mixture of two or more of the compounds described above. An example of a commercially available polyamine is the polyamine sold by Union Carbide under the designation of Amine HH. Amine HH is a blend of polyamines consisting mainly of aminoethylpiperazine and triethylene tetramine.

Suitable reactants for the Mannich reaction include the following: aldehydes such as formaldehyde (the preferred reagent), benzaldehyde, or other tertiary aldehydes; dialdehydes such as glutaraldehyde and glyoxal; or unsaturated aldehydes such as acrolein or croton aldehyde.

The cement slurry also contains an effective amount of sodium carbonate, sodium phosphate, sodium sulfite, sodium metasilicate or naphthalene sulfonate. The amount of the above may be anywhere from 0.1 to 1.5 parts per 100 parts cement. A small amount (0.05 parts per 100 parts cement) of sodium gluconate may also be added.

The above described constituents are employed in a weight ratio to each other and in a total amount which is effective to reduce the loss of fluid from the slurry under typical well conditions. The exact amount of each constituent and the ratio of each contituent to each other will depend on the hydraulic cement employed and on the temperature and pressure of the well and the thickening time desired. Standardized testing procedures such as those developed and reported by the American Petroleum Institute and as described below can be employed to determine the most preferred parameter for each batch of hydraulic cement and for the expected temperature and pressure.

The practice of this invention may be seen in the following examples wherein preparation of sulfonated and sulfomethylated lignin - polyamine - aldehyde condensates and their applications are described.

EXAMPLE 1

Preparation of sulfonated fluid loss control additive

Step 1

For each sample prepared, 100g of softwood kraft lignin was slurried in 400-500 ml. water. To this slurry was added either 1.2, 2.0, or 2.5 moles of sodium sulfite per 1,000g lignin and the pH was adjusted with sodium hydroxide to fall within the range of 7-7.5. The reaction was transferred into a Parr pressure reactor and heated at 135°-160° C. for 2-3 hours.

Step 2

The reaction product of step 1 was mixed with 2, 3, or 5 moles of aminoethylpiperazine or Amine HH per 1,000g lignin. After 30 minutes stirring, either 2, 3, or 5 moles of formaldehyde per 1,000g lignin was added and the reaction mixture was heated at 90° for 6-16 hours.

EXAMPLE 2

Preparation of Sulfomethylated Fluid Loss Control Additive

Step 1

For each sample prepared, 100g softwood kraft lignin was slurried in 400-500 ml water. To this slurry was added either 1.2, 2.0, or 2.5 moles of sodium sulfite per 1,000g lignin and the mixture was stirred for 30 minutes. Then either 0.5 or 1.0 moles of formaldehyde per 1,000g lignin was added and the pH was adjusted, if necessary, with sodium hydroxide to fall in the range of 7-7.5. The reaction mixture was transferred into a Parr pressure reactor and heated at 135°-160° C. for 2-3 hours.

Step 2

The reaction product of step 1 was mixed with either 2, 3, 5, or 8 moles of aminoethylpiperazine or Amine HH per 1,000g of sulfomethylated lignin. After 30 minutes of stirring, either 2, 3, 4, 5, or 8 moles of formaldehyde per 1,000g lignin was added and the reaction mixture was heated at 90° for 6-16 hours.

EXAMPLE 3

High pressure fluid loss tests were carried out according to API recommendations RP10B "Testing Oil Well Cements and Cement Additives," Section 8, p. 43 in a Halliburton (IMCO) high pressure filter press.

The additive level was between 0.3 and 3.5% by weight on cement. A total of 304 mL (38% slurry) or 368 mL (46% slurry) with five drops of Halliburton LF defoamer was used with 800g cement and blended for 35 seconds.

Table I shows the effect of varying degrees of sulfonation or sulfomethylation of softwood kraft lignin reacted in a Mannich-type reaction as described in examples 1 and 2 with varying amounts of Amine HH or aminoethylpiperazine and formaldehyde.

In this table, the reaction products are listed in an abbreviated form:

The "(2.5+0.5) - sulfomethylated lignin - (3+3)" stands for lignin pressure-reacted with 2.5 moles sodium sulfite and 0.5 mole formaldehyde and post-treated with 3 moles Amine HH and 3 moles formaldehyde.

TABLE I

Fluid Loss of 46% Louisiana Class H Cement Slurries Containing a Combination of 1.5% Lignin Amine, 1.5% LOMAR D[a] and 0.05% Sodium Gluconate at 180° F. (1,000 psi)

| Lignin Based Fluid Loss Control Additive | | | Fluid Loss (min/mL) |
|---|---|---|---|
| (1.2 + 0) | Sulfonated Lignin | (2 + 2) | 12/170 |
| (1.2 + 0) | Sulfonated Lignin | (3 + 3) | 30/48 |
| (1.2 + 0) | Sulfonated Lignin | (5 + 5) | 30/36 |
| (2 + 0) | Sulfonated Lignin | (2 + 2) | 5/208 |
| (2 + 0) | Sulfonated Lignin | (3 + 3) | 30/52 |
| (2.5 + 0) | Sulfonated Lignin | (2 + 2) | 4/210 |
| (2.5 + 0) | Sulfonated Lignin | (3 + 3) | 30/32 |
| (2.5 + 0.5) | Sulfomethylated Lignin | (3 + 3) | 30/24 |
| (2.5 + 0.5) | Sulfomethylated Lignin | (3 + 4) | 30/30 |
| (2.5 + 0.5) | Sulfomethylated Lignin | (5 + 5) | 30/22 |
| (2 + 1) | Sulfomethylated Lignin | (2 + 2) | 27/184 |
| (2 + 1) | Sulfomethylated Lignin | (3 + 3) | 30/46 |
| (2 + 0) | Sulfonated Lignin | (3AEP[b] + 3) | 30/34 |

[a]LOMAR D: sodium naphthalene sulfonate
[b]AEP: aminoethylpiperazine

It was found that sulfonated or sulfomethylated lignins reacted with 3-5 moles Amine HH and 3-5 moles formaldehyde perform well as fluid loss control additives when formulated with Nanaphthalene sulfonate and sodium gluconate. The aminated products derived from a pressure-sulfomethylated lignin (2.5 moles sodium sulfite and 0.5 moles formaldehyde per 1,000g lignin) performed best as fluid loss control additives.

EXAMPLE 4

This example compares fluid loss performance, as determined using the testing procedures described in example 3, obtained when sodium naphthalene sulfonate is replaced with sodium sulfite, sodium metasilicite, sodium phosphate, or a sodium carbonate/sodium gluconate blend. The "(2.5+0.5) - sulfomethylated lignin (3+3)" described in Example 3 above was used as the aminated lignin in this example. Evaluation results are presented in Table II.

TABLE II

Fluid Loss of 46% Louisiana Class H Cement Slurries Containing Lignin Amine and Inorganic Salts at 180° F. (1,000 psi)

| Fluid Loss Control Additive | | | | Fluid Loss (min./mL) |
|---|---|---|---|---|
| %[a] | | | | |
| (1.5) LOMAR D[b] | (1.5) Sodium Gluconate | (0.05) | | 30/24 |
| (2.0) Sodium Sulfite | (1.0) Sodium Gluconate | (0.05) | | 30/40 |
| (2.0) Sodium Sulfite | (1.0) | | | 30/36 |
| (2.4) Sodium Sulfite | (0.6) | | | 30/32 |
| (2.7) Sodium Sulfite | (0.3) | | | 30/54 |
| (2.0) Sodium Metasilicate | (1.0) | | | 30/38 |
| (2.7) Sodium Carbonate | (0.3) Sodium Gluconate | (0.05) | | 30/10 |
| (2.4) Sodium Phosphate | (0.6) | | | 30/26 |

[a]Based on Weight
[b]LOMAR D: Sodium naphthalene sulfonate.

Table II shows that all samples tested exhibit good fluid loss performance, with best results achieved by formulating the sulfomethylated aminated lignin with sodium carbonate and sodium gluconate.

EXAMPLE 5

This example shows the effects of an increasing degree of amination with Amine HH and formaldehyde and the addition of sodium sulfite on the thickening time of cement slurries with sulfonated or sulfomethylated lignin-based fluid loss control additives. Lower dosages of the various formulations were compared to better show the effects of increasing amination and the addition of sodium sulfite.

Thickening times were determined in a Halliburton Consistometer (API - Schedule #8, 206° F., 14,000 ft.). Cement slurry was prepared as described in example 3 above. After transfer of the slurries into the slurry cup, the slurry was heated according to the API Schedule. The run was terminated when slurry viscosity reached 70 units of consistency.

TABLE III

Thickening Times of 38% Louisiana Class H Cement Slurries Containing 0.% Fluid Loss Additive
(API Schedule #8, 14,000 ft., 206° F.)

| Fluid Loss Control Additive (%) | Thickening Time (hrs:min) |
| --- | --- |
| (a) (0.3) | 5:16 |
| (a) (0.2) - Sodium Sulfite (0.1) | 3:34 |
| (b) (0.3) | 2:37 |
| (c) (0.3) | 1:43 |
| (d) (0.3) | 1:38 |
| (b) (0.2) - Sodium Sulfite (0.1) | 2:36 |
| (e) (0.3) | 1:18 |

(a) (2.5 + 0.5)-sulfomethylated lignin
(b) (2.5 + 0.5)-sulfomethylated lignin - (3 + 3) + (sulfomethylated lignin reacted with 3 moles Amine HH + 3 moles formaldehyde per 1,000 g).
(c) (2.5 + 0.5)-sulfomethylated lignin - (5 + 5).
(d) (2.5 + 0.5)-sulfomethylated lignin - (8 + 8).
(e) (1.2 + 0)-sulfonated lignin - (5 + 5).

Table III shows that reaction products with increasing amount of Amine HH and formaldehyde decrease thickening times substantially. At 0.3% dosage, a reduction from 5:30 hrs. to 1:45 hrs is observed when 5 moles Amine HH and 5 moles formaldehyde are used for modification. Replacement of 33.3% of the retarder with sodium sulfite also shortens the thickening time.

While this invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

I claim:

1. A method of cementing a zone in a well penetrating a subterranean formation comprising injecting down the well and positioning in the zone to be cemented a hydraulic aqueous cement slurry composition comprising (a) a hydraulic cement, and the following expressed as parts by weight per 100 parts of said hydraulic cement, (b) water from about 25 to 105 parts, and (c) a fluid loss control additive comprising from about 0.5 to 2.5 parts of a compound selected from the group consisting of a sulfonated lignin and a sulfomethylated lignin, wherein said lignin has been aminated by reacting it with between about 2-5 moles of a polyamine and 2-5 moles of an aldehyde per 1,000g of said lignin, and (d) 0.1 to 1.5 parts of a compound selected from the group consisting of sodium carbonate, sodium metasilicate, sodium phosphate, sodium sulfite and sodium naphthalene sulfonate and a combination thereof.

2. The method of claim 1, wherein said cement slurry composition further comprises about 0.05 parts of sodium gluconate.

3. The method of claim 1, wherein said polyamine comprises a blend of aminoethylpiperazine and triethylene tetramine.

4. The method of claim 1, wherein said aldehyde is formaldehyde.

5. In an improved method of cementing a zone in a well penetrating a subterranean formation comprising injecting down the well and positioning in the zone to be cemented a hydraulic aqueous cement slurry composition comprising a hydraulic cement and the following, expressed as parts by weight per 100 parts of said hydraulic cement: from about 25 to about 105 parts water; and, from about 0.5 to about 2.5 parts of a fluid loss control additive selected from the group consisting of sulfonated lignin and sulfomethylated lignin, wherein the improvement comprises aminating the lignin fluid loss control additive by reacting it with between about 2-5 moles of a polyamine and 2-5 moles of an aldehyde per 1,000g of said lignin and including in the composition from about 0.1 to about 1.5 parts of a compound selected from the group consisting of sodium carbonate, sodium metasilicate, sodium phosphate, sodium sulfite and sodium naphthalene sulfonate, and a combination thereof.

6. The improved method of claim 5 wherein the composition further comprises about 0.5 parts sodium gluconate.

* * * * *

UNITED STATES PATENT AND TRADEMARK OFFICE
CERTIFICATE OF CORRECTION

PATENT NO. : 5,012,870
DATED : May 7, 1991
INVENTOR(S) : Peter Schilling

It is certified that error appears in the above-indentified patent and that said Letters Patent is hereby corrected as shown below:

On the title page, item [54] change "SULFORMETHYLATED" and substitute therefor --SULFOMETHYLATED--.

In column 1, line 2, in the title, delete "SULFORMETHYLATED" and substitute therefor --SULFOMETHYLATED--.

In column 2, line 47, delete "Polyamide" and substitute therefor --Polyamine--.

In column 2, line 57, delete "Polyamide" and substitute therefor --Polyamines--.

In column 7, line 11, delete "0.%" and substitute therefor --0.3%--.

Signed and Sealed this

Twenty-sixth Day of October, 1993

Attest:

Attesting Officer

BRUCE LEHMAN

*Commissioner of Patents and Trademarks*